United States Patent
Chang et al.

(10) Patent No.: US 7,578,121 B2
(45) Date of Patent: Aug. 25, 2009

(54) THRUST TERMINATION DEVICE FOR SOLID ROCKET MOTOR

(75) Inventors: Hong-Been Chang, Daejeon-si (KR); Moon-Joong Kang, Daejeon-si (KR)

(73) Assignee: Agency For Defense Development (KR)

( * ) Notice: Subject to any disclaimer, the term of this patent is extended or adjusted under 35 U.S.C. 154(b) by 492 days.

(21) Appl. No.: 11/590,925

(22) Filed: Nov. 1, 2006

(65) Prior Publication Data

US 2007/0113537 A1    May 24, 2007

(30) Foreign Application Priority Data

Nov. 2, 2005    (KR)    .................... 10-2005-0104066

(51) Int. Cl.
    *F02K 9/32*    (2006.01)
(52) U.S. Cl. .................. 60/229; 60/254; 239/265.25
(58) Field of Classification Search .................. 60/229, 60/233, 234, 253, 254; 89/1.812; 102/381; 239/265.25, 265.27
See application file for complete search history.

(56) References Cited

U.S. PATENT DOCUMENTS

| 3,052,091 A | 9/1962 | D'Ooge |
| 3,177,655 A | 4/1965 | White |
| 3,196,610 A | 7/1965 | Anderson |
| 3,442,083 A | 5/1969 | Klotz |
| 3,705,550 A * | 12/1972 | Long .......................... 102/378 |
| 4,171,663 A | 10/1979 | Day et al. |
| 4,484,439 A | 11/1984 | Singer et al. |
| 4,625,649 A | 12/1986 | Russell |
| 5,400,713 A | 3/1995 | Humiston et al. |
| 5,808,231 A * | 9/1998 | Johnston et al. ............. 102/291 |

\* cited by examiner

*Primary Examiner*—Louis J Casaregola
(74) *Attorney, Agent, or Firm*—Banner & Witcoff, Ltd.

(57) ABSTRACT

Disclosed is a thrust termination device for a solid rocket motor, which terminates the net thrust by the reverse thrust of the rocket motor produced from the emission of the combustion gas in the reverse direction, when the stage separation signal is transferred at the normal thrust state of the rocket motor. An object of the present invention is to provide a thrust termination device for a rocket motor, which can contrive to accomplish the structural safety and mechanical sealing performance at the combustion chamber condition of the high temperature and high pressure, and easily remove the thrust termination device even at the low pressure state and open the trust termination ports successively with very small impacts when the thrust termination is commanded.

4 Claims, 3 Drawing Sheets

# THRUST TERMINATION DEVICE FOR SOLID ROCKET MOTOR

BACKGROUND OF THE INVENTION

1. Field of the Invention

The present invention relates to a thrust termination device of a solid rocket motor, which terminates the net thrust by the reverse thrust of the rocket motor produced from the emission of the combustion gas through the opened thrust termination port in the reverse direction, when the stage separation signal is transferred at the normal thrust state of the rocket motor, in particular, to a thrust termination device for a rocket motor, which can contrive to accomplish the structural safety and the mechanical sealing performance at the combustion chamber condition of the high temperature and high pressure, and easily remove the thrust termination device even at the low pressure state and open the trust termination ports successively with very small impacts when the thrust termination is commanded.

2, Background of the Related Art

In general, the solid rocket motor comprises a combustion chamber for combusting solid propellant, and a nozzle for the exit of exhaust gases which makes acceleration of rocket in the opposite direction to the gases flow direction. And the thrust, which is the product of acceleration and mass of rocket, have same direction of acceleration of rocket motor.

There have been developed several kinds of rocket motors, and the principle and mechanism of propulsion are different for each rocket motor. The most widely used rocket motor among them is a chemical rocket motor with an energy source of chemical reaction (combustion) of solid propellant or liquid propellant.

For instance, in a rocket motor using the solid propellant as a fuel, ignition of the solid propellant is performed by a igniting device, and gases produced from the combustion of the solid propellant are exhausted through the outlet of the nozzle, and the retroaction against exhausted gases becomes the thrust of the rocket motor in the normal propulsion state till the practice of the command for the thrust termination. Thus, the rocket motor is provided with a thrust termination device for producing thrust opposing to the thrust of the nozzle so as to neutralize the normal thrust of the nozzle.

When the rocket motor provided with the thrust termination device as described above is schematically reviewed, it comprises a combustion tube for a combustion chamber with a solid propellant charged; a nozzle mounted at the rear of the combustion tube; a dome portion of the combustion tube formed at the front side of the combustion tube; an igniting device mounted at the center of the dome portion of the combustion tube toward the combustion chamber; and a plurality of thrust termination devices mounted at the dome portion of the combustion tube.

According to the rocket motor, normal thrust can be produced at the nozzle at the normal state, however, in this instance, a thrust termination port formed at the dome portion of the combustion tube to communicate with the combustion chamber is maintained to be closed by the thrust termination device. Further, when the command of thrust termination is practiced, the thrust termination port closed by the thrust termination device is instantly opened to produce thrust greater than the normal thrust of the nozzle through the thrust termination ports to thereby impede the forward movement of the rocket motor and reduce the pressure in the combustion tube, so that forward thrust cannot be produced any more in the rocket motor. In this instance, the sum of the sectional areas of the opened thrust termination ports is greater than that of the sectional area of the nozzle throat to thereby make the thrust produced from the thrust termination port greater than the normal thrust of the nozzle, so that the movement of the rocket motor in the forward direction can be impeded.

Conventionally, a Pyrotechnic devices (explosion bolt) described in U.S. Pat. No. 5,400,713 are mostly used in the thrust termination device.

In this regard, it is required for the thrust termination device to be sufficiently safe in structure before the operation, operated rapidly at the operation and reproduced completely. However, when the thrust termination device such as the pyro device was operated, there were produced substantially big impacts, and fragments of the operated device were dispersed, so that the missile had to be affected from the substantial impact during the operation of the thrust termination device to thereby affect badly to the flying stability of the missile and the precision of the control after the thrust termination.

Accordingly, it is very important to reduce the magnitude of impacts at the time of the operation of the thrust termination device.

SUMMARY OF THE INVENTION

Therefore, the present invention has been made to decrease the magnitude of impacts occurring in the prior arts, and an object of the present invention is to provide a thrust termination device for a rocket motor, which can contrive to accomplish the structural safety and the mechanical sealing performance at the combustion chamber condition of the high temperature and high pressure, and easily remove the thrust termination device even at the low pressure state and open the trust termination ports successively with small impacts and smoothly when the command of thrust termination is performed.

To accomplish the above objects, according to the present invention, there is provided a thrust termination device for a rocket motor, which is constructed to close a plurality of thrust termination ports formed at a dome portion of a combustion tube mounted at the front of the rocket motor to communicate with a combustion chamber of the rocket motor in a sealing structure at a normal thrust state, and to open them respectively when a command of thrust termination is performed, the thrust termination device is characterized by comprising a main cylinder opened at one end and supported by the thrust termination ports to close them, and formed with a vent opening at a bottom thereof; a primary piston inserted into the vent opening from the inside of the main cylinder, and transmitted with the pressure in the combustion chamber; a secondary piston mounted around the primary piston in the inside of the main cylinder, and transmitted with the pressure in the combustion chamber through the vent opening by the movement of the primary piston due to the pressure in the combustion chamber; a pressure load transmitting device mounted around a front end of the secondary piston and engaged with the secondary piston; a restriction pin for penetrating through the pressure load transmitting device, and the primary/secondary pistons to restrict them, and having a drawing wire connected at one end thereof and pulled to relieve the restriction state of them, when the command of thrust termination is performed; and a cross plate mounted at the front of the pressure load transmitting device and the main cylinder, and engaged with an inner peripheral surface of the thrust termination port at the edge thereof to restrict the pressure load transmitting device and the main cylinder.

According to the present invention, the thrust termination port is formed at the inner peripheral surface thereof with four spline grooves for inserting the edges of the blades of the cross plate and four sills for supporting the edges of the blades according to the rotation angle of the cross plate.

Further, the restriction pin is a split pin formed to be separated from the pressure load transmitting device, and the primary/secondary pistons by the mechanical drawing force of the drawing wire.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiment of the present invention with reference to the attached drawings. Prior to the detailed description of the present invention, it should be confirmed that the terms or words used in the specification and claims of the present invention are construed as meanings and concepts conforming to the technical spirit of the present invention on the basis of a principle that the inventors can define the concept of the term properly for explain their invention with the best method.

Figure 1:
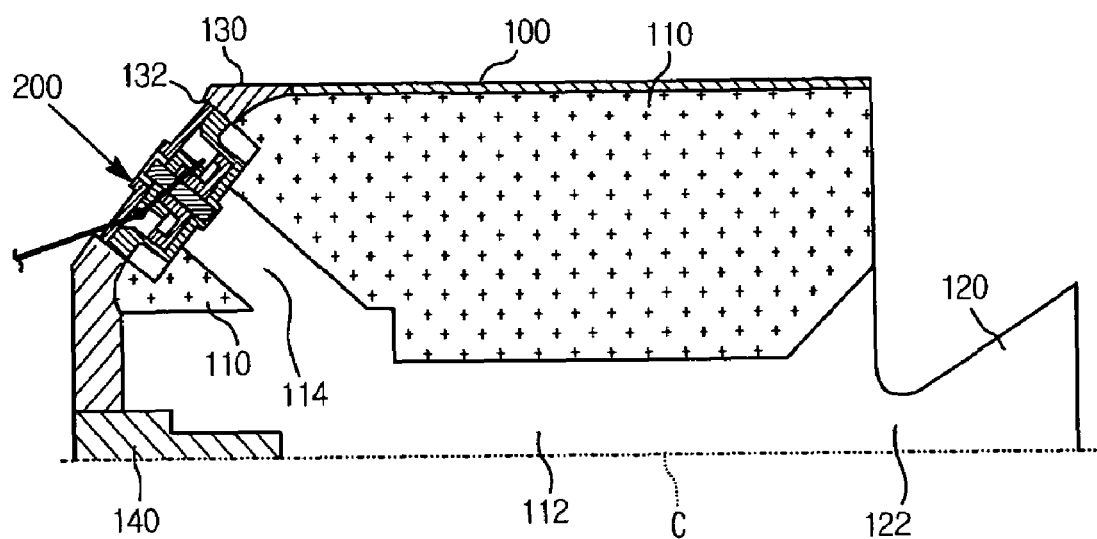
FIG. 1 is a cross-sectional view for showing an example of a rocket motor applied of a thrust termination device of the present invention.

In FIG. 1, an example of a rocket motor applied of a thrust termination device of the present invention is shown.

As shown in the drawing, the rocket motor applied of the thrust termination device 200 of the present invention, comprises a combustion tube 100 forming a combustion chamber 112 and charged with a solid propellant therein, a nozzle 120 mounted at the rear of the combustion tube 100, a dome portion 130 of the combustion tube mounted at the front of the combustion tube 100, an ignition device 140 mounted at the center of the dome portion 130 of the combustion tube toward the combustion chamber 112, and a plurality of thrust termination devices 200 mounted at the dome portion 130 of the combustion tube. For instance, an example is shown that two thrust termination devices 200, 200 are mounted in the dome portion 130 of the combustion tube in a symmetrical structure with respect to the center axis C of the rocket motor.

The thrust termination device 200 according to the present invention is constructed of a mechanical structure that the thrust termination ports 132 formed at the dome portion 130 of the combustion tube 100 to communicate with the combustion chamber 112 are respectively closed in a sealing structure at the normal thrust state of the nozzle 120, and then respectively opened to counterbalance the normal thrust by means of the reverse thrust, when the command of thrust termination is performed. The thrust termination ports 132 can be formed at the dome portion 130 of the combustion tube at 0° and 180° positions, if two ports are formed. Further, it is preferable that the thrust termination ports 132 are formed to have inclination angles of +45° and −45° with respect to the center axis C of the rocket motor, and is communicated with the combustion chamber 112 through the respective passages 114. Also, in order to counterbalance the normal thrust of the nozzle 120 by means of the reverse thrust, the sum of the sectional areas of the thrust termination ports 132 is preferable to be greater than the sectional area of the throat 122 of the nozzle 120.

Figure 2:
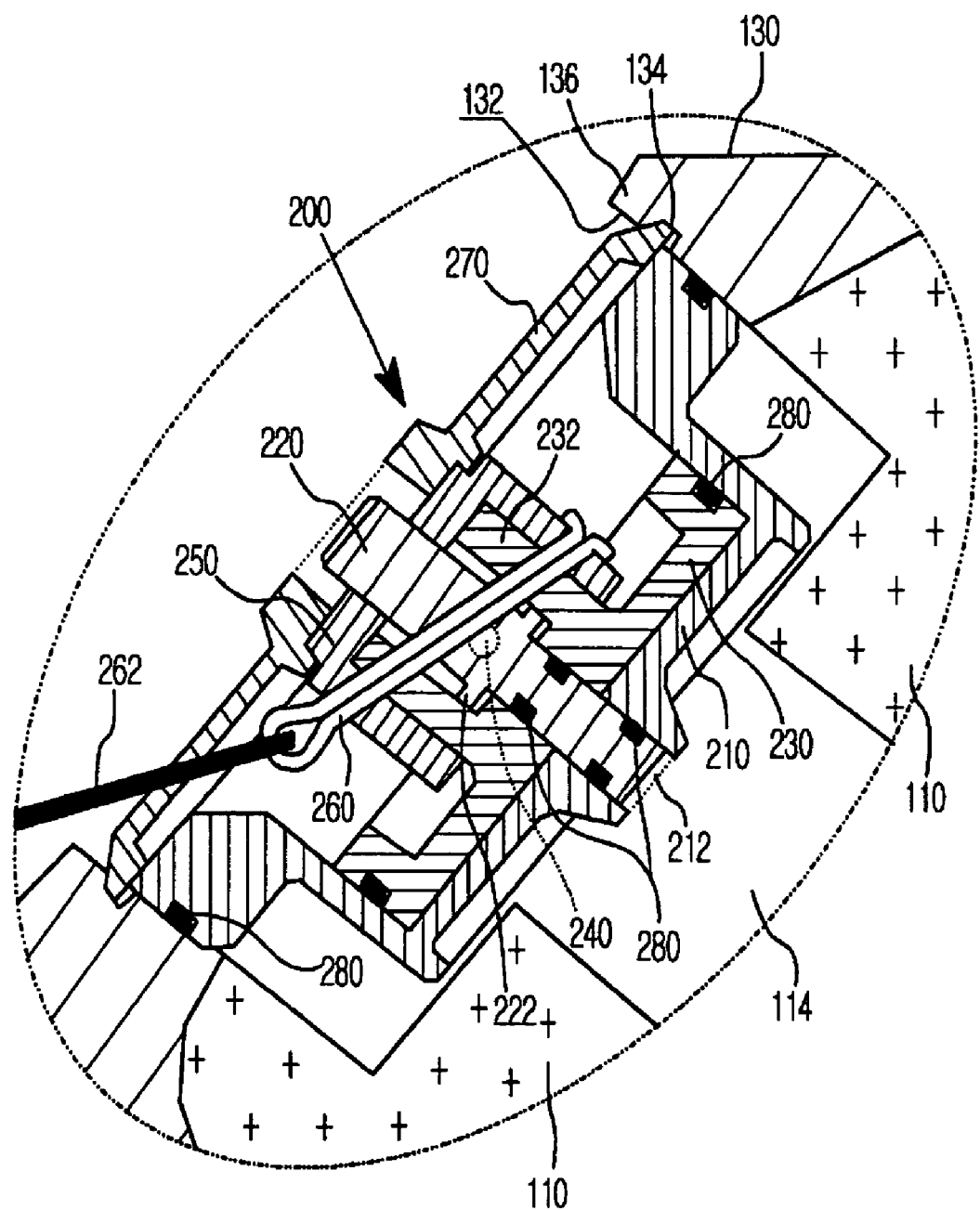
FIG. 2 is an enlarged view of a principal portion in FIG. 1.
Figure 3:
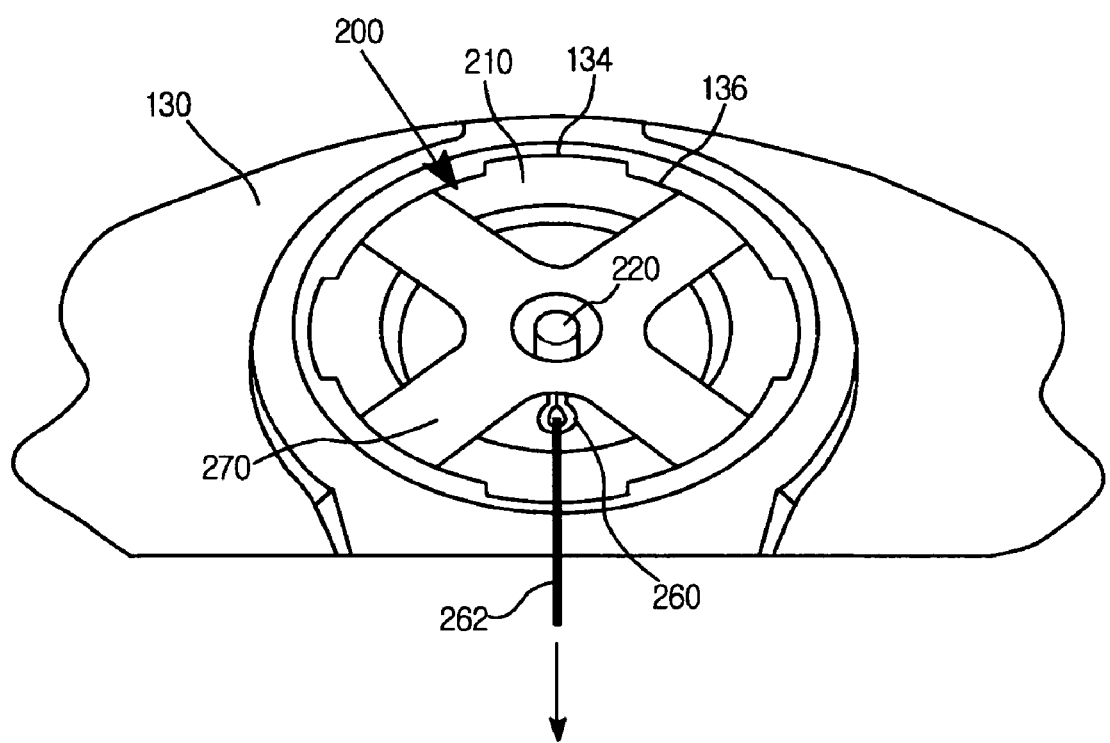
FIG. 3 is a partial front view for showing a rocket motor applied of the thrust termination device according to the present invention.

As shown in FIGS. 1 through 3, the thrust termination device 200 for the rocket motor of the present invention, comprises a main cylinder 210, a primary/secondary pistons 220, 230, pressure load transmitting device 250, a restriction pin 260, and a cross plate 270.

As shown in FIG. 2, the main cylinder 210 is supported by the thrust termination device 132 to close it, constructed to be opened to the outside (in other words, outer axial direction of the thrust termination device 132) at one end, and is formed with a vent opening 212 at the bottom center. The main cylinder 210 can be supported by the thrust termination port 132 in a sealing structure by means of an O-ring 280 at the outer peripheral surface.

Further, the primary piston 220 is constructed that one end of it is inserted into the vent opening 212 from the inside of the main cylinder 210, and the outer peripheral surface of a portion inserted into the vent opening 212 is supported by the main cylinder 210 in a sealing structure. A stopper 222 is the radially protruded portion at the outer peripheral surface of the primary piston 220. In this regard, the stopper 222 acts to locate the primary piston 220 in the proper position into the vent opening 212, and, as will be described hereinafter, to transmit the pressure to the pressure load transmitting device 250 at the time of the movement of the primary piston 220.

Also, the secondary piston 230 is mounted around the primary piston 220 from the inside of the main cylinder 210, to thereby be supported by the main cylinder 210 and the primary piston 220. In other words, the inner peripheral surface of the secondary piston 230 can be supported against the outer peripheral surface of the primary piston 220 by means of the O-ring 280, and the outer peripheral surface of the secondary piston 230 can be supported against the inner peripheral surface of the main cylinder 210. In this regard, the O-rings 280 concurrently function to prevent the gas leaking through the thrust termination port 132 from the combustion chamber 112 at the normal thrust state. In addition, the secondary piston 230 has a boss 232 at the center, into which the primary piston 220 is inserted. The secondary piston 230 can successively move in the moving direction of the primary piston 220 by the gas pressure in the combustion chamber 112 transmitted via the vent opening 212, when the primary piston 220 moves toward the inside of the main cylinder 210 from the vent opening 212 by the gas pressure in the combustion chamber 112.

Further, the pressure load transmitting device 250 is mounted around the front end of the secondary piston 230, that is, around its boss 232, to be engaged with the secondary piston 230. The relative movement of the pressure load transmitting device 250 and the secondary piston 230 is restricted by means of two securing screws 240 radially assembled in opposite positions at both sides of the pressure load transmitting device 250 and the secondary piston 230. Accordingly, the pressure load transmitting device 250 can move together with the secondary piston 230. Also, the pressure load transmitting device 250 can be engaged with the stopper 222 of the primary piston 220, so that more ejecting force can be transmitted from the stopper.

The restriction pin 260 penetrates the pressure load transmitting device 250, the secondary piston 230, and the primary piston 220 in about the radial direction to thereby restrict them. In this regard, the drawing wire 262 is connected to one end of the restriction pin to relieve the restriction state when the thrust termination command is performed. A split pin is used for the restriction pin 260 to separate the pressure load transmitting device 250, and the primary/secondary pistons 220, 230 by such drawing. That is, the protruded ends of the restriction pin 260 are bent after the insertion through the pressure load transmitting device 250, and the primary/secondary pistons 220, 230, and the drawing wire 262 is bound to a head of the restriction pin 260.

Also, the cross plate 270 is mounted at the front of the pressure load transmitting device 250, and supports the pressure load transmitting device 250 and the main cylinder 210 thereof by the engagement of the edge of the cross plate with the inner peripheral surface of the thrust termination port 132. The cross plate 270 should be fabricated with very high strength structure, and also it should be easily separated even at very low inner pressure load transmitted from the combustion chamber 112 via the pressure load transmitting device 250, after the removal of the restriction pin 260 at the time of the perform of the command of the thrust termination to thereby open the thrust termination port 132.

As shown in FIG. 2 and FIG. 3, four spline grooves 134 receiving the edges of the respective blade of the cross plate 270, and four sills 136 for supporting the edges of the blades are formed at the inner peripheral surface of the thrust termination port 132 depending on the rotation angle (that is, 45° rotation) of the cross plate 270. Accordingly, when the cross plate 270 is inserted into the thrust termination port 132 so that edges of the blades can be inserted into the spline grooves 134, if the cross plate 270 is rotated by 45°, the edges of the blades of the cross plate 270 are located inside the sills 136 so that the thrust termination device 200 of the present invention cannot be separated to the outside of the thrust termination port 132.

Next, the action of the thrust termination device for the rocket motor according to the present invention as constructed above will be explained below.

When the thrust termination device 200 for the rocket motor according to the present invention is to be mounted, at first, the main cylinder 210 is inserted into the thrust termination port 132, then, the primary/secondary pistons 220, 230 and the pressure load transmitting device 250 are assembled to the main cylinder 210, and the restriction pin 260 bound of the drawing wire 262 is inserted into the primary/secondary pistons 220, 230 and the pressure load transmitting device 250, and the protruded ends of the restriction pin 260 are bent toward the outer peripheral surface of the pressure load transmitting device 250, to thereby prevent the falling out of the restriction pin 260. Further, after the insertion of the respective blade of the cross plate 270 into the spline groove 134, the cross plate 270 is rotated so that the blades of the cross plate 270 are engaged with the sills 136 to thereby complete the assembly of the thrust termination device 200 of the present invention.

Thus, after the thrust termination device 200 of the present invention has been mounted to the rocket motor, if the solid propellant is ignited by means of the ignition device 140, gases in the combustion chamber 112 is exhausted through the nozzle 120 to produce the thrust. At the normal thrust state of the nozzle 120, the cross plate 270 is subjected to the pressure load transmitted in the thrust termination port 132, and restricts the outward movement of the pressure load transmitting device 250 and the main cylinder 210.

At such normal thrust state of the nozzle 120, when the command of the thrust termination is performed, the drawing wire 262 is pulled with the mechanical structure, then the bent both ends of the restriction pin 260 of the split pin structure are spread to separate the restriction pin 260 from the pressure load transmitting device 250 and the primary/secondary pistons 220, 230.

As described above, when the restriction pin 260 is separated, the primary piston 220 becomes to move from the vent opening 212 to the inside of the main cylinder 210 by the pressure of the combustion gas in the combustion chamber 112, and the pressure of the combustion gas in the combustion chamber 112 is transmitted to the lower side of the secondary piston 230 through the vent opening 212, so that the secondary piston 230 can also move in the direction identical with that of the primary piston 220. Accordingly, since the pressure load transmitting device 250, firstly transmitted with the pressure load through the stopper 222 of the primary piston 220, is engaged with the secondary piston 230, the pressure load transmitting device 250 is pushed toward the cross plate 270. Therefore, the cross plate 270 is deformed because the pressure load of the combustion gas is transmitted to the center of the cross plate 270 through the pressure load transmitting device 250, and the blades of the cross plate are separated from the sills 136 so that the main cylinder 210, the primary/secondary pistons 220, 230, and the pressure load transmitting device 250 are all pushed to thereby open the thrust termination port 132.

Accordingly, the net thrust can be terminated because reverse thrust can be produced in the direction opposing to the normal thrust through the nozzle 120. That is, when the thrust termination ports 132 are opened as described above, the sum of the sectional areas of the thrust termination ports 132 becomes to be greater than the sectional area of the throat of the nozzle 120 to thereby produce the reverse thrust surpassing the thrust produced at the nozzle 120, and the lower motor (not shown) is separated, and the pressure of the combustion chamber 112 is reduced, and in some cases combustion is terminated.

According to the thrust termination device for the rocket motor of the present invention constructed as described above, it is possible to accomplish the best performance in the flying stability and the control precision at stage separation of a missile or thrust termination of the rocket motor, by the smooth and stable opening of the thrust termination port 132 without big impact through the small drawing force for removing the restriction pin 260, and the progressive operation of the parts.

Further, it is possible to increase the structural safety of the thrust termination device and perform the smooth opening of the thrust termination port 132 by the progressive actions using the multi-piston structure.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A thrust termination device for a rocket motor, which is constructed to close a plurality of thrust termination ports formed at a dome portion of a combustion tube mounted at the front of the rocket motor to communicate with a combustion chamber of the rocket motor in a sealing structure at a normal thrust state, and to open them respectively when a command of thrust termination is performed, wherein the thrust termination device comprises:

a main cylinder opened at one end and supported by the thrust termination ports to close them, and formed with a vent opening at a bottom thereof;

a primary piston inserted into the vent opening from the inside of the main cylinder, and transmitted with the pressure in the combustion chamber;

a secondary piston mounted around the primary piston in the inside of the main cylinder, and transmitted with the pressure in the combustion chamber through the vent opening by the movement of the primary piston due to the pressure in the combustion chamber;

a pressure load transmitting device mounted around a front end of the secondary piston and engaged with the secondary piston;

a restriction pin for penetrating through the pressure load transmitting device, and the primary/secondary pistons to restrict them, and having a drawing wire connected at one end thereof and pulled to relieve the restriction state of them, when the command of thrust termination is performed; and a cross plate mounted at the front of the pressure load transmitting device and the main cylinder, and engaged with an inner peripheral surface of the thrust termination port at the edge thereof to restrict the pressure load transmitting device and the main cylinder.

2. The thrust termination device for a rocket motor according to claim 1, wherein the thrust termination port is formed at the inner peripheral surface thereof with four spline grooves for inserting the edges of the blades of the cross plate and four sills for supporting the edges of the blades according to the rotation angle of the cross plate.

3. The thrust termination device for a rocket motor according to claim 1, wherein the restriction pin is a split pin formed to be separated from the pressure load transmitting device, and the primary/secondary pistons by the mechanical drawing force of the drawing wire.

4. The thrust termination device for a rocket motor according to claim 2, wherein the restriction pin is a split pin formed to be separated from the pressure load transmitting device, and the primary/secondary pistons by the mechanical drawing force of the drawing wire.

* * * * *